United States Patent [19]
Gratien Ferrier

[11] Patent Number: 6,027,073
[45] Date of Patent: Feb. 22, 2000

[54] WINDOW RELEASE SYSTEM

[75] Inventor: Jean-Jacques Victor Gratien Ferrier, Velaux, France

[73] Assignee: Eurocopter, France

[21] Appl. No.: 09/116,170

[22] Filed: Jul. 16, 1998

[30]     Foreign Application Priority Data

Jul. 18, 1997  [FR]  France ................................ 97 09166

[51] Int. Cl.[7] .................................................. B64C 1/14
[52] U.S. Cl. ........................... 244/129.3; 49/141; 49/466
[58] Field of Search .......................... 244/129.3; 49/141, 49/466

[56]              References Cited

U.S. PATENT DOCUMENTS 3,737,193   6/1973   Cain ...................................... 244/129.3
4,283,885   8/1981   Remick et al. ............................ 49/466
4,541,595   9/1985   Fiala et al. ............................ 244/129.3
5,826,824  10/1998   Martin et al. ......................... 244/129.3

FOREIGN PATENT DOCUMENTS 1 146 364  11/1957  France .
2 341 726   9/1977  France .
  673 951   3/1939  Germany .
  758 023   7/1954  Germany .
17 15 159 U 1/1956  Germany .

*Primary Examiner*—J. Woodrow Eldred
*Attorney, Agent, or Firm*—Piper Marbury Rudnick & Wolfe

[57]                ABSTRACT

The invention is relative to a window frame, in particular a window for a helicopter intended to fix the window onto a support. This frame includes cutting out means driven by pulling on at least a part of the window perimeter in order to divide into two at least a section of the frame and thus detach the window from the support.

5 Claims, 4 Drawing Sheets

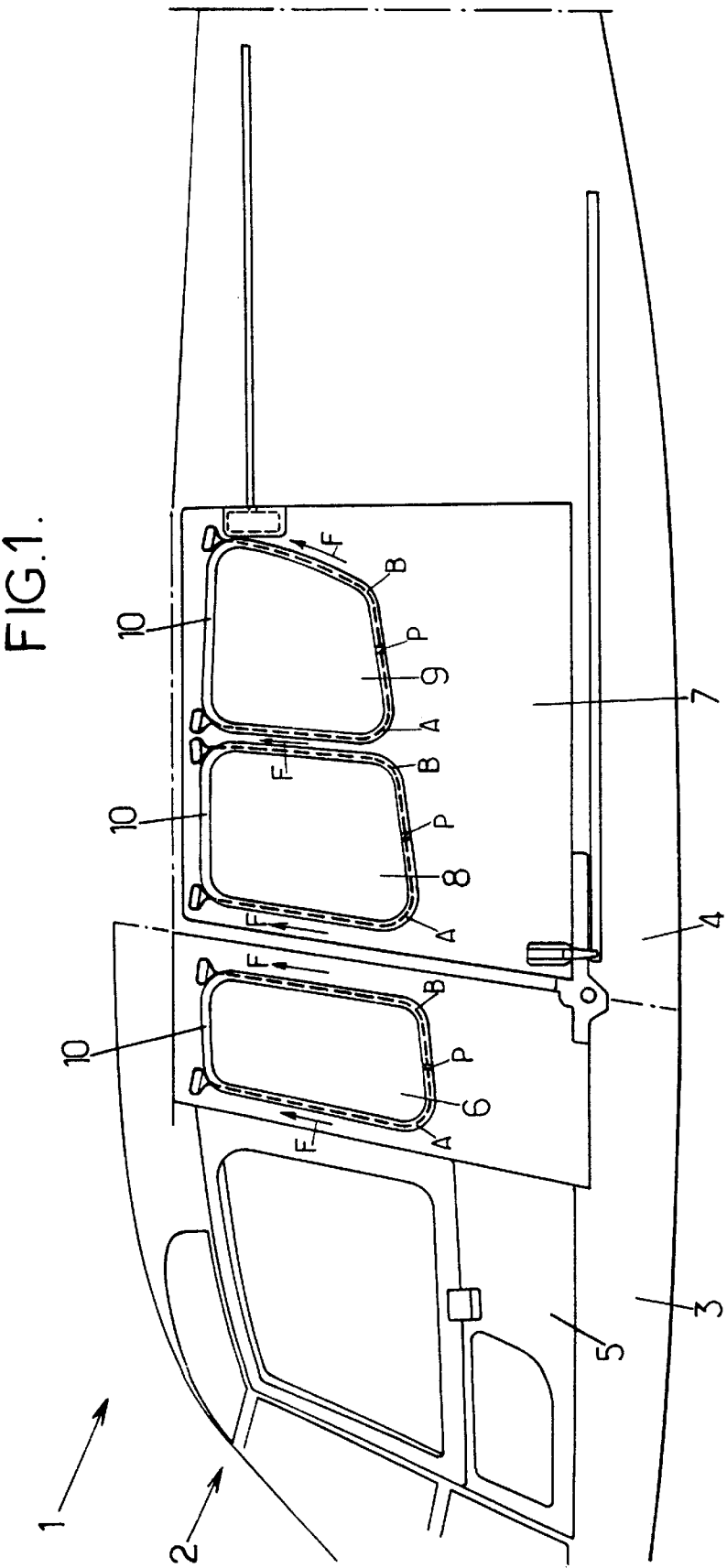

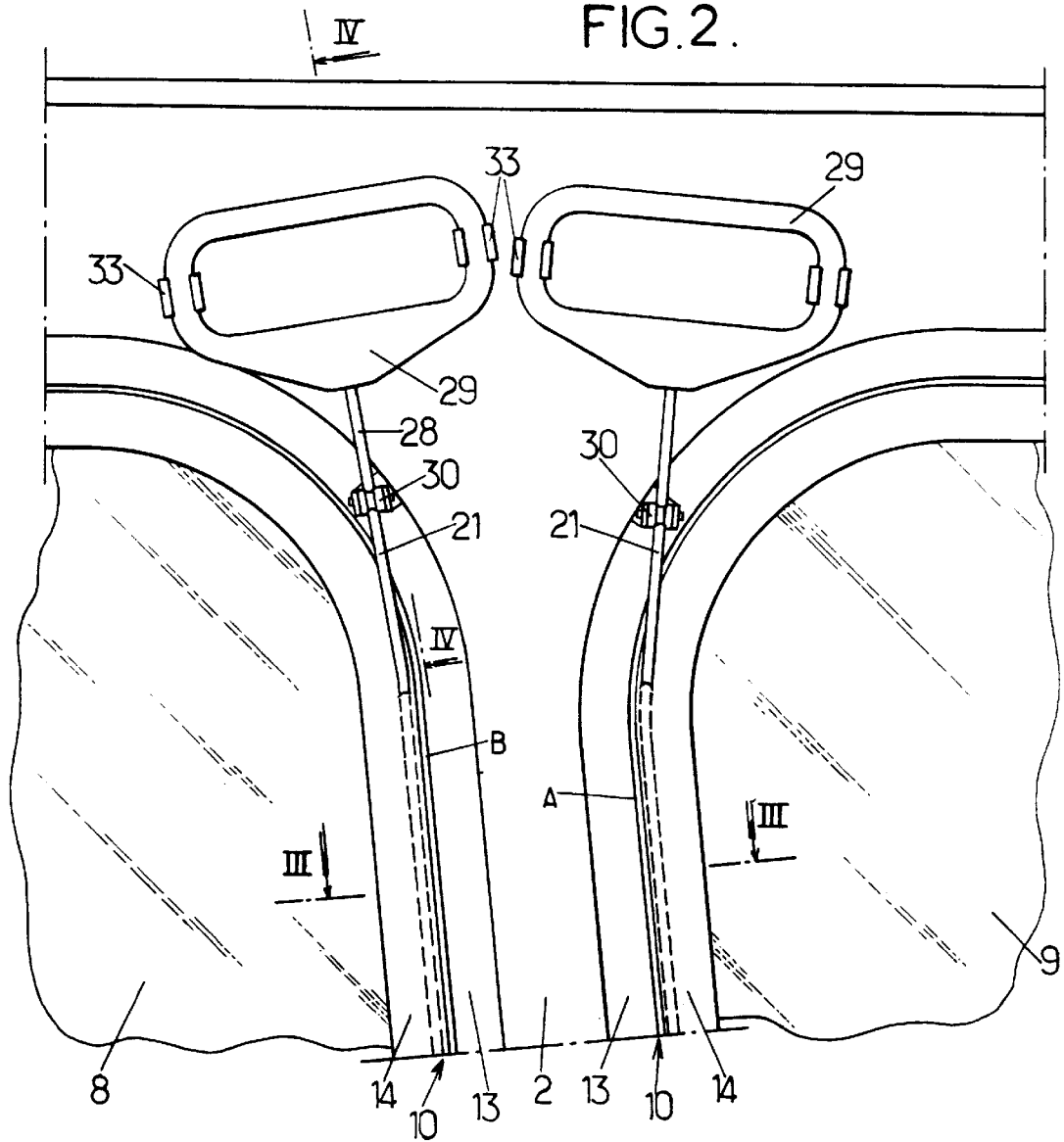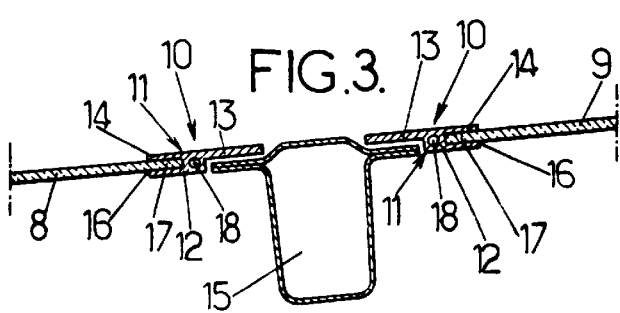

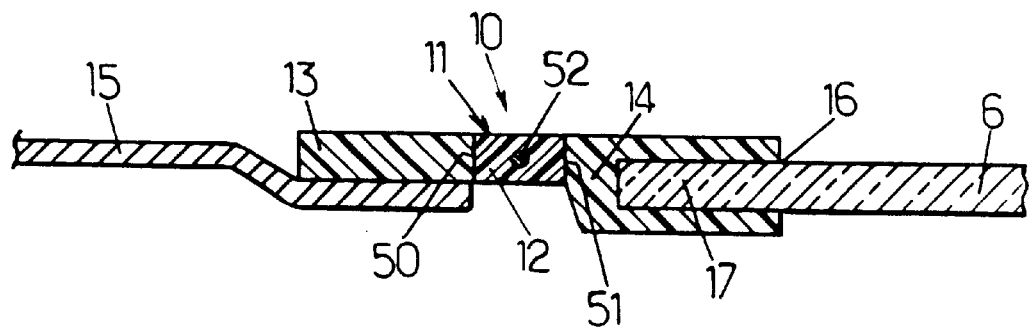
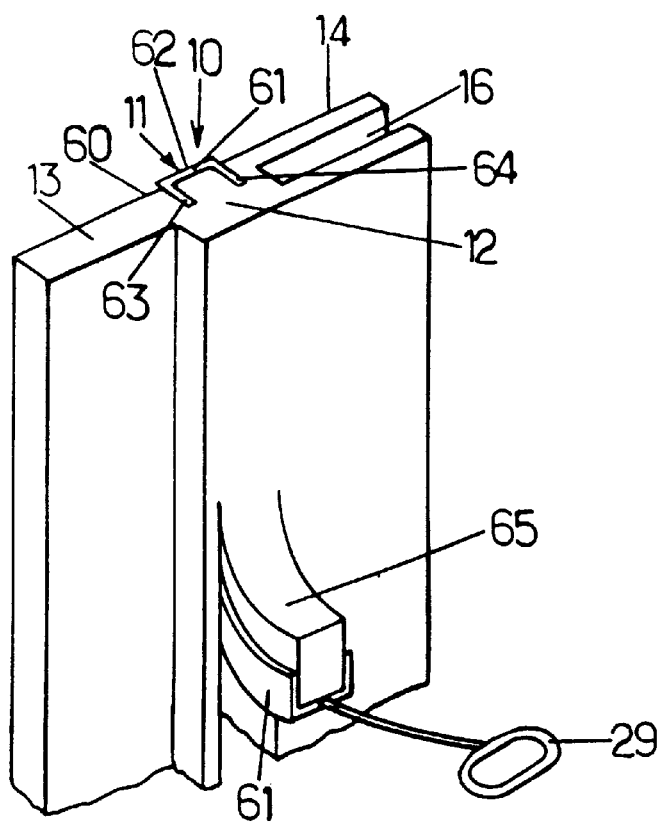

WINDOW RELEASE SYSTEM

FIELD OF INVENTION

The present invention is relative to a window frame, in particular for a helicopter window, intended to fix the window on a support.

BACKGROUND OF THE INVENTION

When a major incident takes place during the operating of a helicopter, it is necessary to proceed with the emergency evacuation of the aircraft.

If the helicopter doors are jammed and impossible to open, the passengers must exit the aircraft through the windows after having proceeded to release them.

Now, each window is connected to the aircraft structure by means of a frame. Typically, and as described in the document DE-A-673 951, this frame is made up:

- of a joint comprising a central layer from which extends an external edge and an internal edge, the external edge being intended to be fixed onto the support and the lower edge being intended to immobilise the window; and
- of means for cutting out the frame which are carried by the central layer and which are driven by pulling on at least a part of the window perimeter in order to divide into two at least a section of the frame and thus disconnect the window from the support.

In this document, the means of cutting out consist of a metal wire buried in the joint and extending over the whole perimeter of the window. A free end of the wire is fixed to a handle which can be grabbed by a passenger.

In order to release such a window, the passenger must pull on the handle along the window perimeter so that the metal wire can cut out the joint and thus disconnect the window from the structure.

However, the cutting out of the joint is not very easy insofar as the passenger must exert a force of great intensity.

SUMMARY OF THE INVENTION

The invention has the object of remedying the inconveniences mentioned above by supplying a window frame easy to release by the passenger, light and having an appearance shaped in relation to the aircraft structure and this, by simple, effective and cheap means.

To that end, the invention has as its object a window frame of the previously mentioned type, in particular a helicopter window, intended to fix the window on a support, mainly characterised by the fact that the central layer comprises a longitudinal passage and the cutting out means include at least a blade and a wire, the blade being buried at least partly in the joint and the wire being housed in the longitudinal passage in order to drive the blade on a part at least of the window perimeter.

The frame in accordance with the invention can possibly include in addition, one or more of the following characteristics:

- the means of cutting out comprise a double blade consisting of a central part passed through by a first end of the wire, the height of the double blade being at least equal to the thickness of the joint central layer;
- the two blades are inclined rearward relative to their driving movement and the central part comprises a protuberance which is situated in front of the blades and which gives a punching effect during movement of the double blade;
- the internal edge of the joint includes a window reception groove and the external efge of the joint is thinned down in order to be adhered to the support, such that the window, the joint and the support form an approximately continuous and flat surface; and
- the wire comprises a second end passed into a means of reverse movement and fixed to a pulling handle, the means of return movement being fixed to the support, approximately vertically from the joint central layer.

The invention also has the object of a window frame of the previously mentioned type, in particular for a helicopter window, intended to fix the window onto a support, mainly characterised by the fact that the central layer is made in an elastomeric material harder than that of the internal and external edges.

This frame can possibly include in addition a metallic cable which is buried in the central layer and which is connected to a handle projecting into the helicopter interior, the central layer comprising two lateral walls along which it is connected to the internal and external edges, the frame being divided into two by the shearing effect between the central layer and the internal and external edges, along the central layer lateral walls.

Furthermore, the invention also has the object of a window frame of the previously mentioned type, in particular a window for a helicopter, intended to fix the window onto a support, mainly characterised by the fact that a gutter is carried by an external face of the central layer and comprises branches with sharp ends.

The frame can possibly be such that the gutter is connected to a driving handle projecting into the helicopter interior, the frame being cut out by pulling on the handle which drives the gutter, the branches of which cut the central layer.

BRIEF DESCRIPTION OF THE DRAWINGS

Three examples of realisation of the invention will now be described compared with the appended drawings, on which:

FIG. 1 is a partial side view of a helicopter structure including three windows having a frame in accordance with a first method of realisation of the invention;

FIG. 2 is a partly enlarged view of two of the windows shown in FIG. 1;

FIG. 3 is a section view along the line III—III of FIG. 2;

FIG. 6 is a transverse section view of a second method of realisation of a window frame intended to fix a window to the structure of a helicopter such as shown in FIG. 1; and FIG. 7 is a partly perspective view of a third method of realisation of a window frame in accordance with the present invention.

DETAILED DESCRIPTION

Figure 4:
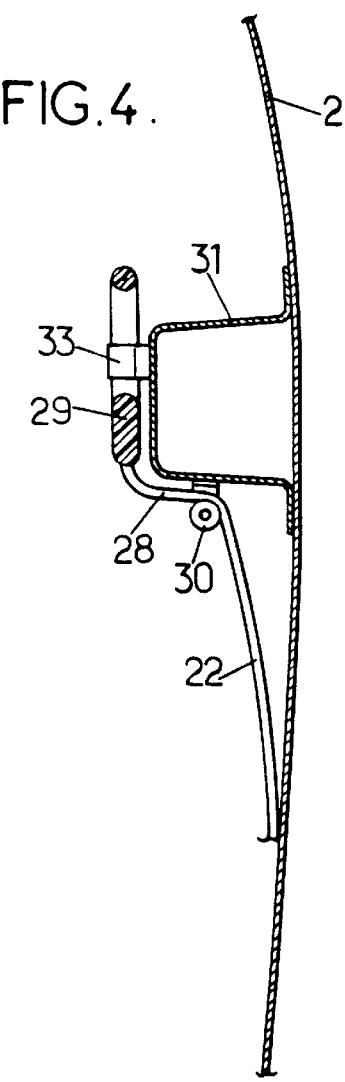
FIG. 4 is a section view along the line IV—IV of FIG. 2.

Partially shown in FIG. 1 is a helicopter airframe 1 comprising a structure 2 constituted by a front cabin 3 and a rear passenger compartment 4.

The front cabin 3 has, behing a front pilot door 5, a passenger window 6. The rear compartment 4 has, for example, a door sliding longitudinally relative to the airframe in order to allow access to the helicopter interior by rear passengers. This sliding door 7 has, for example, two windows 8 and 9.

Each of the windows 6, 8 and 9 is fixed to the helicopter structure 2 by a frame 10. The structure 2 thus here plays the role of a support for each of the windows.

In order to separate, in an emergency, each of the windows 6, 8 and 9 from the support 2, each of the frames 10 has means of cutting out the aforesaid frame which are moved by pulling on at least a part of the window perimeter so as to cut at least a section of the frame.

In the first method of realisation shown in FIGS. 1 to 5, each frame has two sets A, B of means of cutting out which are each intended to cut out the frame along a vertical upright and along the middle of a lower horizontal transom of each window 6, 8, 9, in the direction of the arrows F, from the upper horizontal transom to the point P, situated approximately in the middle of the lower transom.

Each frame 10 includes a joint 11 which comprises a central layer 12 from which extends laterally an external edge 13 as well as an internal edge 14. The external edge 13 is intended to be fixed onto a reinforcement 15 of the support 2 whilst the internal edge 14 is intended to receive the window.

To that end, and as is shown more particularly in FIG. 3, the internal edge 14 has a reception groove 16 into which the window perimeter 17 penetrates.

The external edge 13 of the joint 11 is thinned relative to the internal edge 14 so as to be adhered on the support 2 whereas providing continuity of the external surface of the support 2, of the frame 10 and of the window.

Furthermore, the central layer 12 of the joint 11 has an internal longitudinal passage 18 intended to guide the means for cutting out the frame.

Figure 5:
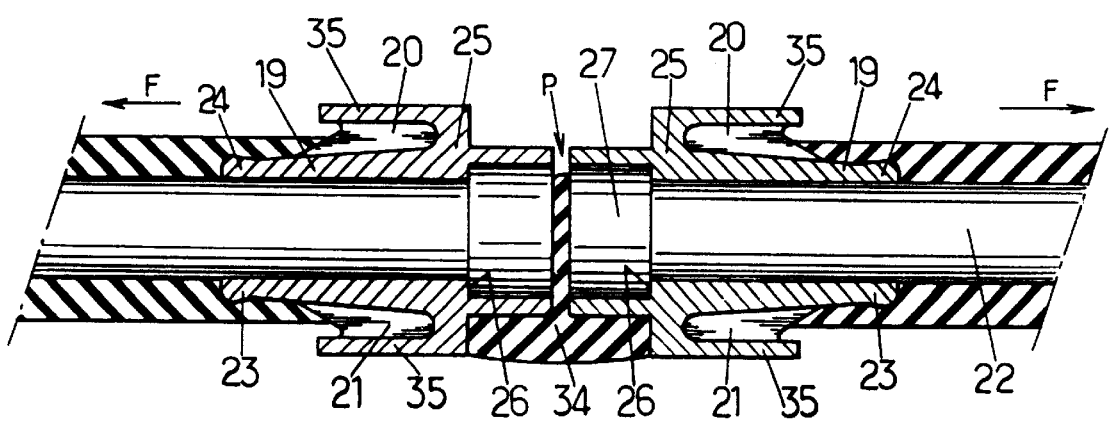
FIG. 5 is a longitudinal section view of means of cutting out the frame shown in FIG. 1.

In this first method of realisation, the cutting out means of each of the sets A and B, shown in longitudinal section in FIG. 5, comprise firstly, a sleeve 19 on which two cutting blades 20 and 21 project radially, and secondly, a driving wire 22 intended to drive the sleeve 19 and the blades 20, 21 in the direction of the arrows F.

The internal diameter of the sleeve 19 is approximately equal to the diameter of the internal passage 18 and the sleeve 19 converges in the direction of forward movement defined by the arrow F. The height of the blades projecting radially around the sleeve is such that each of the blades 20 and 21 passes through the thickness of the central layer 12. These blades are moreover inclined rearward relative to the driving movement and each have, in the upper part, a horizontal flange 35 ensuring the guiding of the blades during their displacement.

The front end 23 of the sleeve 19 has a protuberance projecting into the interior of the central layer 12 in order to obtain a swelling of this central layer 12 at the time of the cutting out by pulling on the wire 22.

The rear end 25 of the sleeve 19 has a shoulder 26 in which a first end 27 of the wire 22 is immobilised.

The second end 28 (FIG. 4) projects outside the joint 11, near the upper part of the window in order for a pulling handle 29 to be fixed after having passed in the return means 30 carried by a reinforcement 31 of the support 2.

The return means 30 consist of a roller carried by a clevis fixed to the reinforcement 31 approximately vertically from the central layer 12 of the joint 11. The handle 29 is immobilised on the reinforcement 31 by professionally known clipping means 33.

Furthermore, as shown in FIG. 5, each of the sleeves 19 of the two sets A and B of the cutting out means are mutually mounted in opposition, at the point P. In this point, a joint 34 is mounted on each of the rear ends 25 of the sleeves 19 in order to ensure sealing of the window.

At the time of an accident, in order to release the window, it is sufficient to unhook the two pulling handles 29 and to exert on them a downwards action. During this movement, each wire 22 is driven around the return means 30, which causes displacement of the sleeves 19 and the blades 20, 21 inside the central layers 12 of the joints 11 from the point P to near the window upper transom.

During their movement, the blades 20 and 21 cut through the thickness of the joints 11, thus detaching the window from its support. The cutting of the joints 11 is facilitated by the presence of protuberances 24 in front of the sleeves 19 which cause a swelling of the central layer 12 just at the moment of cutting out, enabling reducing the pulling effort on the handle. The passenger can then exit the helicopter through the aforesaid window.

Second and third methods of realisation of the frame 10 are shown in FIGS. 6 and 7. These frames are intended to fix a window 6, 8 or 9 such as is shown in FIG. 1 on to the support of a helicopter airframe.

In the following, the components common to the first, second and third methods of realisation will carry identical reference numbers.

The frames 10 of the second and third methods of realisation shown respectively in FIGS. 6 and 7 comprise, as in the first method of realisation, a joint 11 which includes a central layer 12 from which extend laterally an external edge 13 and an internal edge 14. These edges 13 and 14 are respectively intended to be fixed onto the reinforcement 15 of the support 2 and to receive the window perimeter 17 in the groove 16.

In the second method of realisation, the central layer 12 is made in an elastomeric material harder than that of the external 13 and internal 14 edges. The central layer 12 thus has two lateral walls 50 and 51, which separate it from the external and internal edges, and which have a flat surface. On at least a part of the length of the central layer 12, a metallic cable 52 is buried, a first end of which (not shown) projects beyond the central layer 12 toward the interior of the helicopter cabin. At this end a driving handle of the pulling handle type 29 shown in FIG. 2 is fixed.

When a user wishes to detach the window 6 from the helicopter cabin, it is sufficient for him to pull on the driving handle. This handle drives the metallic cable 52, which enables an easy cutting out of the frame by a shearing effect, along the walls 50 and 51, between the central layer and the internal, external edges, made in elastomeric materials of different hardness.

In the third method of realisation shown in FIG. 7, the central layer 12 includes, in its face 60 directed toward the outside of the cabin, a gutter 61 having a bottom 62 and two branches 63, 64. These two branches are forced into the central layer 12 and include sharp ends. The gutter 61 is made in a flexible metallic material and is vulcanised onto the central layer 12. The bottom 62 of the gutter 61 is connected to a driving handle similar to the pulling handle 29 and projects inside the cabin.

In order to separate the window from the cabin, it is sufficient to pull the gutter 61 toward the cabin interior using the handle (as shown in FIG. 7). The branches 63 and 64 then cut the central layer 12 and a draught excluder 65 is also cut. The internal and external edges of the frame are detached from each other and the window can be withdrawn.

I claim:

1. A window frame for securing a window to a support, the frame comprising:

a joint comprising a central layer from which extends an external edge and an internal edge, the external edge being intended to be fixed onto the support and the internal edge being intended to immobilise the window; and means for cutting out the frame which are carried by the central layer and which are driven in a direction by pulling onto at least a part of the perimeter of the window in order to divide into two at least a section of the frame and thus detach the window from the support, characterised by the fact that the central layer comprises a longitudinal passage and the cutting out means include at least one blade and a wire, the blade being buried at least in part in the joint and the wire being housed in the longitudinal passage in order to drive the blade on a part at least of the window perimeter.

2. A frame in accordance with claim 1, characterised by the fact that the cutting out means comprise two blades, each of said two blades having a central part passed through by a first end of the wire, the height of the double blade being at least equal to the thickness of the central layer of the joint.

3. A frame in accordance with claim 2, characterised by the fact that the two blades are inclined rearwards relative to their driven direction and that the central part includes a protuberance which is situated in front of the blades and which gives a punching effect during the movement of the double blade.

4. A frame in accordance with claim 3, characterised by the fact that the internal edge of the joint includes a reception groove for the window and the external edge of the joint is thinned in order to be adhered to the support, so that the window, the joint and the support form an approximately flat and continuous surface.

5. A frame in accordance with claim 4, characterised by the fact that the wire comprises a second end passed in return means and fixed to a pulling handle, the return means being fixed to the support, approximately vertically from the central layer of the joint.

* * * * *